June 15, 1965    A. DILLENBURGER    3,189,133
TELESCOPIC SHOCK ABSORBERS
Filed Oct. 29, 1962

FIG. I

A. DILLENBURGER    INVENTOR:

BY J. L. Kallin
ATTOURNEY.

United States Patent Office 3,189,133
Patented June 15, 1965

3,189,133
TELESCOPIC SHOCK ABSORBERS
Albert Dillenburger, Andernacher Strasse 28a,
Koblenz-Lutzel, Germany
Filed Oct. 29, 1962, Ser. No. 233,599
5 Claims. (Cl. 188—94)

The present invention concerns known telescopic shock absorbers comprising a liquid-filled working cylinder, a working piston mounted axially slidable therein and guided by a connecting rod, valves formed therein and an elastic compensating element, the purpose of which is to compensate the varying immersion volume of the connecting rod into the operating fluid and also changes in the density of the operating fluid caused by temperature fluctuations.

In known devices of this kind, the elastic compensating element is constructed in the manner of a compensating piston adapted to be axially displaced in the working cylinder subject to spring or gas pressure, which piston, when being produced, necessitates very accurate, time wasting and costly machining of the inner wall surface of the working cylinder and nevertheless during operation considerably stresses this inner wall surface, gradually wearing it out and thereby reducing the sealing effect particularly in the region which is intended to define the liquid-filled space from the gas-filled space of the shock absorber.

Known single tube shock absorbers require good and expensive tube qualities for producing the working cylinder, to prevent it from being dented due to stone impact or other effects from the outside and thereby impairing to a greater or lesser extent its operation. In the case of two-tube or multi-tube shock absorbers this danger does not prevail, but these have to be constructed either in wider and more expensive shapes or a reduction of the effective absorbing cross-section has to be taken into account.

An object of the invention is to effect substantial simplification of the assembly of the shock absorbers.

The invention will become apparent from the following description and the accompanying drawing illustrating a preferred embodiment of the invention.

In the drawing:

FIG. 1 is a vertical section through the shock absorber and

Figure 2:
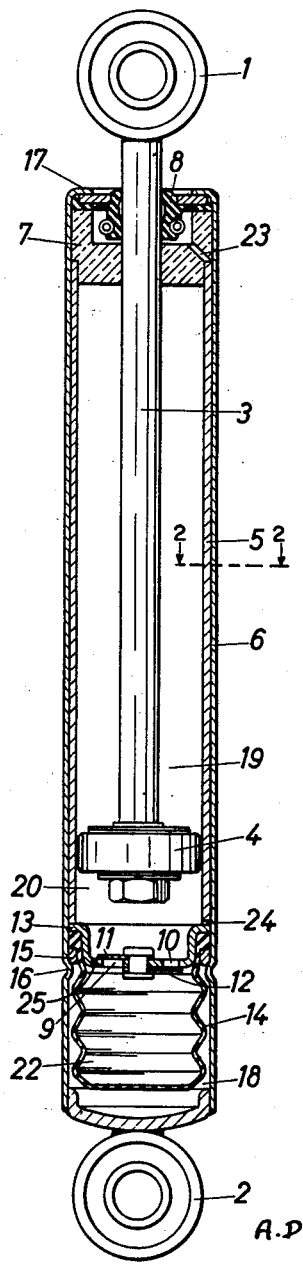
FIG. 2 is an enlarged cross-section detail on line 2—2 of FIG. 1.

The body of the shock absorber is formed by the inner cylinder 5 and the outer cylinder 6 which are telescoped one in the other. The inner cylinder 5 is shorter, smooth throughout and open at both ends, whilst the outer cylinder 6 projects at both ends beyond the inner cylinder and at its upper end has the flanged edge 17 with a certain spaced relationship from the lower edge, an encircling bead 16 rolled in. The working piston 4 equipped in conventional manner with a passage opening and valves, which is screwed to the connecting rod 3, is slidably mounted in the inner cylinder 5.

The upper closure element of the cylinder comprises the trough-shaped end piece 7 of rigid, possibly slightly elastic material and a packing 9 of an elastic material, such as rubber, synthetic rubber such as "Perbunan" or the like, which packing is possibly enclosed by a known tension ring of rigid material. The trough-shaped end piece 7 and the packing 8 have an axial bore, in order to permit them to guide the connecting rod 3 passing through in a sealed manner. The trough-shaped cavity of the end piece is somewhat larger than the packing arranged in the interior thereof, so that a free space is left around it which is adapted to receive small droplets of oil which possibly during displacement of the connecting rod are dragged out of the working compartment of the cylinder.

From the bottom of the trough-shaped cavity of the end piece one or more narrow bores 23 lead to the outer edge of the upper rim of the inner cylinder. These bores continue in depressions or grooves which are formed in the outer wall surface of the inner cylinder or the inner wall surface of the outer cylinder and lead downwardly to one or more notches or slots 24 in the lower edge of the inner cylinder 5. This provides a tract through which small quantities of operating fluid, which have arrived in the trough-shaped cavity of the end piece 7, may run back into the working compartment of the cylinder filled with operating fluid. The operating level, taking the surface tension of the prevailing operating fluid into consideration, need be dimensioned only so that the fluid is conveyed by capillary action to the lower edge of the inner cylinder 5.

The said flutings or grooves on the outer wall surface of the inner cylinder and the inner wall surface of the outer cylinder are shown in FIG. 2 of the drawing. It may be possible to omit grooves or flutings completely, and it is sufficient for the stated purpose to have systems of cavities which are formed automatically between the inner and the outer cylinder, because they on the one hand are not accurately ground one in the other and on the other hand in circumstances are slightly but differently unground.

The space above and below the working piston 4 is filled with operating fluid, for example, oil, glycol or glycerine.

The fluid compartment is closed at its lower end by a bottom wall unit comprising a ring of rigid material or a rigid intermediate wall 13 with fluid passages 9, 10 and valves 11, 12 and also a bag- or bellows-shaped elastic compensating element 14, which preferably extends downwardly, as shown in the drawing. In the event of a combination with the rigid ring, the bag-like or bellows-like elastic compensating element may also extend upwardly, so that its base assumes a position nearest to the underside of the compensating piston.

This bottom wall end unit for the fluid-filled compartment is firmly clamped between the lower edge of the inner cylinder 5 and the bead 16 of the outer cylinder 6. In the illustrated embodiment, this is effected with co-operation of a supporting ring 15 in such a manner that the lower conveniently thickened edge folded over outwardly of the opening of the elastic compensating element is clamped between the underside of the outwardly flanged edge of the intermediate wall 13 and the surface of the supporting ring 15. The volume of operating fluid fills the space 19 above the working piston 4, the space 20 below the working piston and the space within the elastic compensating element 14. Fluctuations in the volume of operating fluid, caused by the varying immersion depth of the connecting rod 3 and/or variations in the density of the fluid owing to temperature fluctuations, are compensated by the fact that the elastic compensating element 14 varies its volumetric capacity proportionally with these fluctuations, in that its wall either expands or contracts again or opens out and folds back again. This applies both to the compensating element shown in the drawing and the compensating element which extends from the supporting ring upwardly with its base nearest the working piston 4.

On its side which is not wetted by the operating fluid the elastic compensating element is surrounded by a gas volume, which may be subjected to atmospheric or higher pressure. The gas volume is limited by the lower part of the outer cylinder 6 and the base plate of the screwed in end piece with closure part 2.

It is of course possible for the mobility of the elastic compensating member 14 to be increased further by the fact that the bellows pleats are fixed and reinforced by metal rings incorporated therewith or that between the closure bottom of the compensating element and the base of the end piece 2 a supporting spring is also installed.

The shock absorber assembly illustrated in the drawing may be constructed as follows:

The tension ring 15 is inserted in the outer cylinder 6, which is not yet flanged over, from above up to the bead 16, the elastic compensating element 14 is positioned thereover with its open edge supported on the tension ring, and over this the rigid intermediate wall 13 supported on the edge of the compensating member 14, whereupon these three parts by inserting the cylinder 5, are clamped between the lower edge thereof and the bead 16. Subsequently thereto the working piston 4 screwed to the connecting rod 3 is inserted in the cylinder 5. Before or after this operation the comparements or spaces 19, 20 and 14 are filled with operating fluid. Subsequently, the trough-shaped end piece 7 and the packing 8 are successively mounted on the connecting rod until the shoulder of the trough-shaped end piece 7 stops against the upper edge of the inner cylinder 5 and firmly clamped by means of the bored rigid intermediate plates indicated in the drawing and producing the flanging 17 of the outer cylinder 6.

The end piece 2 with the closure part is now screwed into the internal thread on the end of the outer cylinder 6 and hence the gas compartment or space of the shock absorber formed. The latter may be subjected to any desired gas pressure which is required to set a required tension ratio between non-compressible fluid volume and compressible gas volume in known manner through an opening, not shown, in the base of the end piece or closure member. Basically the pressure in the gas compartment may amount to 30 atms. or more.

The assembly is thus completed by the closure part 1 being rigidly connected to the free end of the connecting rod 3.

In use the shock absorber in accordance with the invention operates as follows: If the working piston 4 is upwardly displaced in the direction of the end piece 7, a corresponding portion of the fluid situated in the compartment 19 is displaced via the throttle passages, not shown, of the working piston 4 into the enlarged compartment 20 situated below it. Because the immersion depth of the connecting rod 3 in the operating fluid is shortened, the overall volume of both compartments 19+20 is thus increased relative to the state in the lowermost position of the working piston shown in the drawing, whilst the fluid volume filling these compartments remains constant. This state would bring about a disengagement of the fluid on the underside of the working piston and therefore requires compensating. This compensation is effected by the feature that, by the suction effect of the working piston 4 displaced upwardly and a pressure exerted by the gas volume in the air compartment 18 against the compensating element 14, there is conveyed through the open passage 9 of the intermediate wall 13 enough fluid into the space or compartment 20 so that also the overall cavity 19+20 despite its enlargement is constantly filled with operating fluid and the fluid on the underside of the piston never disengages therefrom. Owing to the large cross-section of the passage 9 the fluid in this phase is only slightly throttled, when passing through the compartment 14 into the compartment 20. The fluid subjected to pressure in the compartment 19 during the upwards movement of the working movement however only slightly loads the packing 8, because it is not possible for any dangerous pressure build-up to occur in the trough-shaped cavity of the rigid end piece 7. The configuration in accordance with the invention of the upper closure unit of the shock absorber thus increases the sealing capacity and the life of the only sealing region stressed by sliding between fluid and gas, which the shock absorber of the invention still possesses.

Any fluid droplets possibly overflowing into the trough-shaped cavity of the end piece 7 are returned via the previously described tract comprising the bore 23 over the gap between the inner cylinder 5 and the outer cylinder 6 and notch or slot 24 formed on the lower end of the inner cylinder 5, into the working compartment of the cylinder. This tract may, of course, be basically shorter, so that the oil quantities to be discharged are conveyed back thereby only into the space or compartment 19 above the working piston 4. For this purpose the inner cylinder 5 at any point in its upper portion should be furnished with apertures which communicate with the lower end of the bore 23. The disadvantage of this however is that the packing 8, when the connecting rod is pulled out, is loaded with the full tractive absorption. Therefore a long tract is preferred which is completely filled with fluid, so that during the actuation of the shock absorber a circulation of the fluid takes place.

If the working piston 4 from an upper position is downwardly displaced in reversed direction, then the operating fluid is thus forced through the throttle passages in the absorbing piston 4 from space or compartment 20 into space or compartment 19, whilst simultaneously by inserting the connecting rod 3, the overall volume of the spaces or compartments 19 and 20 is reduced relative to the state in the uppermost position of the working piston, the fluid volume filling it remaining constant. This lack of space of the non-compressible fluid volume requires compensation. The movement of the working piston forces the fluid through the exposed opening 25 without noticeable resistance into the compartment 22 of the compensating element 14, and with rapid insertion of the connecting rod the fluid with considerable throttling by the passage 10 which has a smaller cross-section than the passage 9, and by the valve 12 of the intermediate wall 13 much more considerably throttled, is led into this compartment, which is then able to compensate the fluid pressure built up thereby, because its wall is resilient and adapted, by expansion or unfolding of the resilient wall against the pressure of the compressible gas volume in the gas compartment 18, to increase the capacity of the compartment 22 so that the fluid displaced by progressive immersion of the connecting rod may be accommodated in the enlarged cavity of the compensating element 14.

The requirement of a shock absorber of variable capacity in the fluid-filled compartment is comparatively small for compensating the varying connecting rod volume. The compensation for the variation of fluid density occurring owing to temperature fluctuations during operation, may require four to five times the requirement of the connecting rod compensation. The drawing shows the state of the shock absorber with maximum immersion volume of the connecting rod and at maximum operating temperature.

The apparatus in accordance with the invention is purely a shock absorber, and is not applicable for wholly or partly supporting the vehicle load in the manner of a so-called telescopic leg or strut, because this would require overall heights in the order of magnitude of several metres.

The apparatus in accordance with the invention is a readily operated, slender shock absorber adapted to operate satisfactorily in any position, which has a somewhat enlarged compartment for the compensating element without necessitating the working cylinder to be mechanically enlarged. For this purpose a cheap thin-walled tube is so slipped over an also cheap working cylinder that it encloses it and above and below it forming a compartment wider by the wall thickness of the inner cylinder. Within the range of operation of the working position the apparatus, owing to the cylinders telescoped one in the other, has double the wall thickness. With the arrangement described of the two cylinders of varying length telescoped one in the other, it is also possible for the different components of the apparatus to be interconnected in a particularly simple and time saving manner and yet in a perfectly reliable manner and with sealing effect. The tract between the outer wall surface of the inner cylinder and the inner wall surface of the outer cylinder provided for the fluid circulation, causing the fluid to circulate between the compartment for the connecting rod packing and the lower end of the fluid filled working compartment, also prevents any excessive pressure build-up acting against the connecting rod packing 8 with tractive movements in rapid succession. The connecting rod is herewith preserved from excessive frictional engagement and this is of decisive importance to the ready operation of the shock absorber.

I claim:

1. A telescopic shock absorber comprising, an outer cylinder having top and bottom portions, a shorter inner cylinder mounted substantially without clearance inwardly of said outer cylinder, the exterior wall of said inner cylinder being in engagement with the inner wall of said outer cylinder, said walls having irregularly disposed bleed grooves forming capillary passages for fluid, said outer cylinder having a top flange spaced from the top end of the inner cylinder, a trough shaped end piece provided with a bore communicating with the interior of said outer cylinder for the passage of liquid, secured between said top flange and the top end of said inner cylinder, a packing disposed centrally of said trough; a bottom wall unit comprising a transverse bottom wall spaced from the bottom edge of said outer cylinder, said bottom wall having fluid passages therein; an accordion-like elastic compensating element extending downwardly of said bottom wall into the bottom portion of the outer cylinder, a closure unit including a head piece provided with an annular connecting part and secured to the bottom end of the outer cylinder, a piston slidable in said inner cylinder and a connecting rod secured with one end to said piston and extending outwardly through said packing.

2. A telescopic shock absorber as claimed in claim 1, characterised by the feature that the bottom wall unit comprises a ring of non-elastic material which is clamped between the lower edge of the bottom wall and a bead on the outer cylinder and is fixed to the concentric accordion-like compensating element closed at one end, more especially of elastically yielding material, which with its open edge is clamped between the edge of the ring and the bottom wall.

3. A telescopic shock absorber as claimed in claim 2 wherein said bottom wall unit is provided with valves.

4. A telescopic shock absorber as claimed in claim 3 wherein the open edge of the accordion-like compensating unit is so clamped between one flanged over edge of the bottom wall and an intermediate ring arranged outside thereof, said bottom wall, non-elastic ring, and accordion-like compensating unit are retained between the lower edge of the inner cylinder and the bead of the outer cylinder.

5. A telescopic shock absorber as claimed in claim 4 characterised by the feature that the accordion-like compensating unit on its side where it is not in contact with the operating fluid is enclosed by gas at a pressure of 1 to 30 atms.

References Cited by the Examiner

UNITED STATES PATENTS

| 1,833,939 | 12/31 | Gibbs | 188—88 |
| 2,314,404 | 3/43 | Katcher | 188—100 |
| 2,608,403 | 8/52 | Luther | 188—88 X |
| 3,025,558 | 3/62 | Hawks | 188—100 X |
| 3,039,566 | 6/62 | Rumsey | 188—100 X |

FOREIGN PATENTS 1,075,097 4/54 France.

ARTHUR L. LA POINT, *Primary Examiner.*

EUGENE G. BOTZ, *Examiner.*